Patented Nov. 9, 1943

2,334,063

UNITED STATES PATENT OFFICE 2,334,063

ELECTROLYTIC PROCESS FOR TREATMENT OF WHOLE DISTILLERY SLOP

Charles J. Brockman, Athens, Ga.

No Drawing. Application October 14, 1941,
Serial No. 414,975

5 Claims. (Cl. 204—137)

This invention relates to the electrolytic treatment with alternating current of whole waste slop produced from the manufacture of whiskey, alcohol, or other distilled alcohol containing liquors, to recover therefrom valuable solids, as by-products, and to render the remaining liquid inoffensive, thus facilitating its disposal.

In the manufacture of distilled alcoholic compositions, grain, Irish potatoes or other starchy raw material is ordinarily ground, cooked with water to bring the mass into paste form and hydrolize the starch, and malt is then added to convert the carbohydrates to maltose. The resultant mixture, known as mash, is innoculated with yeast and fermentation allowed to proceed. When the fermentation is complete the material is distilled to remove the alcohol, leaving a liquid known as "whole slop" which contains comminuted solids of a putrifiable nature.

The disposal of waste slop has been a serious problem in the distilling industry, not only because such slop emanates offensive odors, but when discharged into streams or rivers it causes pollution, kills fish and is a menace to health.

In attempting to minimize these detrimental effects it has been the rather general practice to remove as much of the solid matter from whole slop as possible by screening and to discard the remaining thin slop. The thin slop, however, also contains solid matter, but in a too finely divided condition to be removed by screening. In spite of the fact that the finely divided solids would constitute a salable by-product of distilling processes, the evaporation of large quantities of water for their recovery is not economically feasible.

It has heretofore been considered impracticable to subject whole slop to electrolysis because of its thick consistency and the difficulty which would be experienced in obtaining complete coagulation of the contained solid matter, but I have discovered that under controlled conditions hereinafter described a more rapid coagulation is effected when whole slop is electrolyzed than in the processes which preliminarily screen it and electrically treat the thin slop alone. The elimination of the step of screening whole slop facilitates recovery of the solids and reduces the cost of producing the by-product.

It is accordingly an object of my invention to provide a more economical process for the treatment of distillery waste by electrolyzing whole slop under controlled conditions.

Another object of my invention is to electrolyze whole slop in heated condition by use of alternating current.

A further object of my invention is to provide a process for cheaply and effectively rendering distillery waste inoffensive, so that after the removal of salable by-products it may be dumped into streams or otherwise discarded without objectionable consequences.

These and other objects of my invention are achieved, briefly, in subjecting whole slop with all of its contained solids to the electrolyzing action of alternating current at about 4 volts and 150 amperes per square foot of electrode surface with the pH value controlled to within the limits of 3.6 and 7.0, the whole slop being treated in hot condition and either with or without the addition of a small quantity of common salt or of materials which will increase the alkalinity of the final product.

I have found that in the treatment of thick slop several critical limitations are essential namely, the control of hydrogen ion concentration, the control of temperature of reaction, control of current density and the control of the character of the raw material.

In the practice of this invention, the hydrogen ion concentration must be maintained between pH 3.6 and 7.0 to achieve the best results. This was determined by the following experiments:

(a) Thick slop was electrolyzed at an elevated temperature below its boiling point using alternating current of a density of one ampere per square inch of electrode surface, the hydrogen ion concentration of the mixture being adjusted to a pH of 3.0. Satisfactory coagulation of solids was not achieved.

(b) Thick slop was electrolyzed at an elevated temperature below its boiling point using alternating current of a density of one ampere per square inch of electrode surface, the hydrogen ion concentration of the mixture being adjusted to a pH of 3.6. Satisfactory coagulation of solids was achieved.

(c) Thick slop was electrolyzed at an elevated temperature below its boiling point using alternating current of a density of one ampere per square inch of electrode surface, the hydrogen ion concentration of the mixture being adjusted to a pH of 7.0. Satisfactory coagulation of solids was observed.

(d) Thick slop was electrolyzed at an elevated temperature below its boiling point using alternating current of a density of one ampere per square inch of electrode surface, the hydrogen ion concentration of the mixture being adjusted to a pH of 7.5. Satisfactory coagulation of solids was not obtained.

The process should be performed at an elevated temperature for optimum results. This fact was determined by the following experiments:

(e) Thick slop was electrolyzed using alternating current of a density of one ampere per square inch of electrode surface at a hydrogen ion concentration expressed as pH within the range 3.6 to 7.0 at an elevated temperature below boiling (140° F.). Satisfactory coagulation of solids was observed. When the experiment was repeated at room temperature, satisfactory coagulation was not achieved.

Low current densities, such as are suitable for electrolysis of thin as distinguished from thick slop, should not be used in the practice of this invention if satisfactory coagulation of solids is to be achieved. This fact was determined by the following experiments:

(f) Thick slop was electrolyzed at a hydrogen ion concentration expressed as pH within the range of 3.6 to 7.0 at an elevated temperature below boiling using alternating current at about 4 volts of a density of .75 ampere per square inch of electrode surface. Satisfactory coagulation of solids present was not achieved.

(g) Thick slop was electrolyzed at a hydrogen ion concentration expressed as pH within the range of 3.6 to 7.0 at an elevated temperature below boiling using alternating current of about 4 volts at a density of 1 ampere per square inch of electrode surface. Satisfactory coagulation of the solids was achieved, both in this instance and in experiments wherein higher current densities were employed.

As a specific example, about 0.5% by weight of common salt or of alkali is added to whole slop which is heated to a temperature of from 120° to 180° Fahrenheit. The whole slop is then treated in batch or circulated through apparatus between iron electrodes to which alternating current is applied. The current density used should be of the order of 150 amperes or higher per square foot at about 4 volts or more, depending upon the amperage of the current. The current density preferably should be at least one ampere per square inch of electrode surface.

Treatment in batch may be completed in two or three minutes after which the liquid is discharged as waste and the solids which have been coagulated by electrolysis are removed from the apparatus and dried. If the slop is treated while under conditions of flow the liquid may be preferably re-cycled through the electrolyzer until it is clear and shows no turbidity. The solids are then recovered and dried, and the liquid discarded as above described.

The resulting solid product is valuable as a cattle feed or fertilizer depending upon the pH value of the whole slop from which it was obtained. The acidity of the whole slop expressed in pH should not be lower than 3.6 nor over 7.0 where the resulting product is intended for use as cattle feed.

Although the addition of ionizing materials to whole slop is not an essential part of my process, about 0.5 percent by weight of common salt not only facilitates electrolysis but also constitutes a desirable addition to the ultimate product when that product is to be used as cattle feed. Other salts in small quantity may be substituted for sodium chloride, or materials such as lime, soda ash or caustic soda may be added if increased alkalinity is desired.

Slop resulting from the preparation of other alcoholic liquids, or from the use of other starchy materials may also be treated in the manner above set forth. The conditions of time and electric current are likely to be somewhat different from those herein stated but in general the same results may be achieved by the same method, the whole slop being electrolyzed while hot.

This application is a continuation-in-part of my application entitled: Electrolytic process for treating whole distillery slop, Serial Number 147,353, filed June 9, 1937, now Patent Number 2,275,217, dated March 3, 1942.

Having thus described my invention, what I desire to secure by Letters Patent of the United States is:

1. A process of treating distillery slop that comprises electrolyzing whole slop at a pH of 3.6 to 7.0 while at a temperature above 120° Fahrenheit but below boiling by alternating current of a density not less than 1 ampere per square inch of electrode surface and of approximately 4 volts to coagulate the solids therein, and collecting the said solids.

2. A process of treating distillery slop that comprises adding to whole slop approximately 0.5% by weight of an ionizable compound of the class consisting of sodium chloride and alkalies, subjecting the whole slop at a pH of 3.6 to 7.0 while at a temperature above 120° Fahrenheit but below boiling to the action of an alternating electric current at a current density of not less than one ampere per square inch of electrode surface to coagulate the solids therein, and collecting the said solids.

3. A process of treating distillery slop that comprises electrolyzing whole slop at a pH of 3.6 to 7.0 and at a temperature of about 140° Fahrenheit by alternating current of a density not less than 1 ampere per square inch of electrode surface and of approximately 4 volts to coagulate the solids therein, and collecting the said solids.

4. A process of treating slop produced in the manufacture of alcohol containing distilled liquids which comprises electrolyzing whole slop at a temperature of from 120° to 180° Fahrenheit at a pH of 3.6 to 7.0 by alternating current of a density not less than 1 ampere per square inch of electrode surface and of approximately 4 volts to coagulate the solids therein, and collecting the said solids.

5. A process of treating distillery slop that comprises adding to whole slop approximately 0.5% by weight of an ionizable compound of the class consisting of sodium chloride and alkalies, maintaining the acidity at a pH value between 3.6 and 7.0, electrolyzing the whole slop at a temperature of from 120° to 180° Fahrenheit by the action of an alternating electric current at a current density of not less than one ampere per square inch of electrode surface to coagulate the solids therein, and collecting the said solids.

CHARLES J. BROCKMAN.